No. 748,799. PATENTED JAN. 5, 1904.
H. C. SHEPPARD.
VARIABLE SPEED AND REVERSING GEAR.
APPLICATION FILED APR. 27, 1903.
NO MODEL. 3 SHEETS—SHEET 1.

Witnesses
Inventor
Herbert C. Sheppard

No. 748,799. PATENTED JAN. 5, 1904.
H. C. SHEPPARD.
VARIABLE SPEED AND REVERSING GEAR.
APPLICATION FILED APR. 27, 1903.
NO MODEL. 3 SHEETS—SHEET 2.

No. 748,799. PATENTED JAN. 5, 1904.
H. C. SHEPPARD.
VARIABLE SPEED AND REVERSING GEAR.
APPLICATION FILED APR. 27, 1903.
NO MODEL. 3 SHEETS—SHEET 3.

No. 748,799. Patented January 5, 1904.

UNITED STATES PATENT OFFICE.

HERBERT CHARLES SHEPPARD, OF PORTHCAWL, ENGLAND, ASSIGNOR OF ONE-HALF TO FREDERICK MILBURN, OF CARDIFF, GLAMORGANSHIRE, WALES, ENGLAND.

VARIABLE-SPEED AND REVERSING GEAR.

SPECIFICATION forming part of Letters Patent No. 748,799, dated January 5, 1904.

Application filed April 27, 1903. Serial No. 164,462. (No model.)

*To all whom it may concern:*

Be it known that I, HERBERT CHARLES SHEPPARD, a subject of the King of Great Britain, residing at Sandhurst Newton, Porthcawl, Glamorganshire, Wales, England, have invented new and useful Improvements in Variable-Speed and Reversing Gear, of which the following is a specification.

This invention relates to improvements in variable-speed and reversing gear.

According to the invention the end of the driving-shaft has keyed upon it a toothed wheel, which gears with a similar wheel rotatably mounted on an arm, frame, or the like, preferably loosely mounted on the said driving-shaft. This second wheel gears with a third wheel similarly mounted on the said arm, frame, or the like and the spindle of which has keyed upon it a fourth wheel which gears with a wheel keyed upon the end of the driven shaft, which is in axial alinement with the driving-shaft. By this arrangement it will be clear that the driven shaft is rotated in the reverse direction to the driving-shaft.

To vary the speed transmitted by the above-described gearing to the driven shaft, means are provided whereby the aforesaid arm, frame, or the like can be caused to rotate in either direction, so that the resultant speed imparted to the driven shaft is increased or diminished and its direction reversed, as desired.

Figure 1:
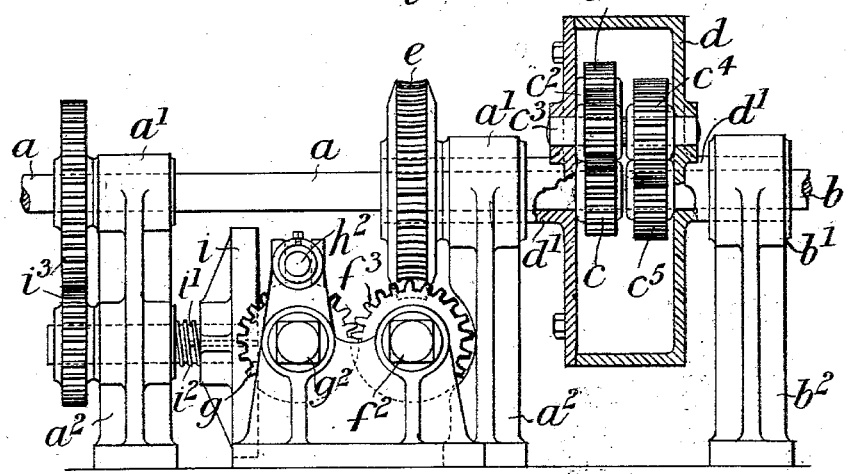
Figure 2:
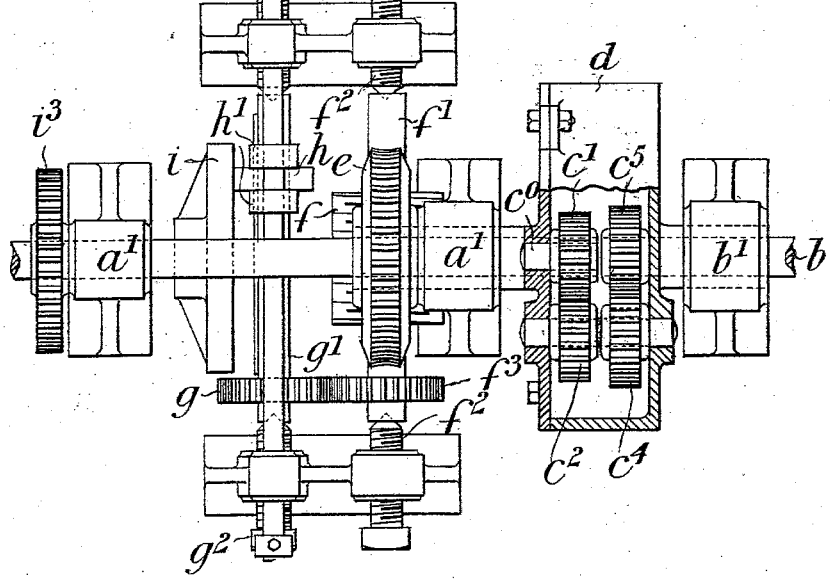
Figure 3:
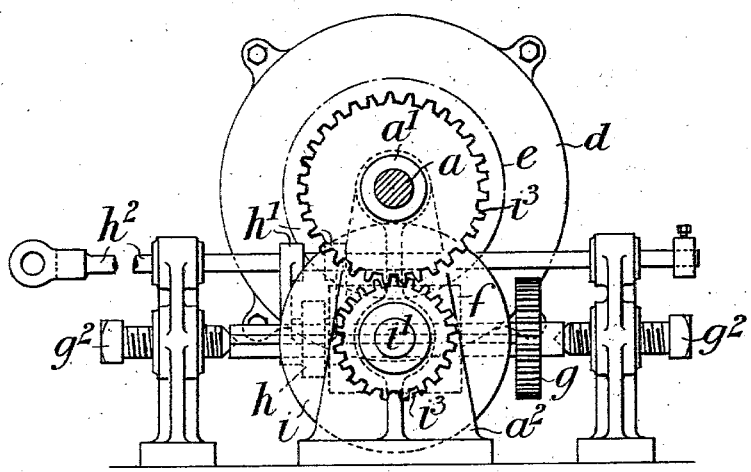
Figure 4:
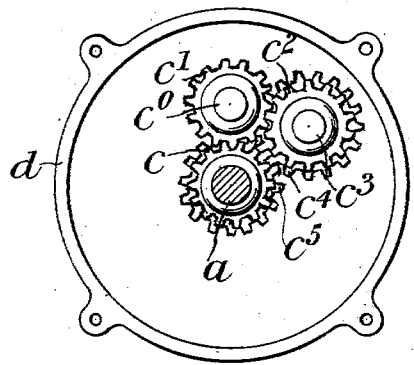
Figure 5:
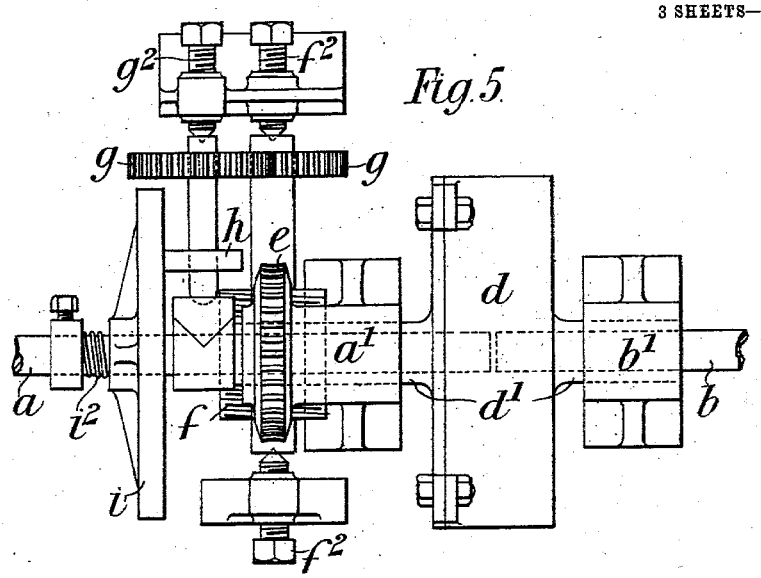
Figure 6:
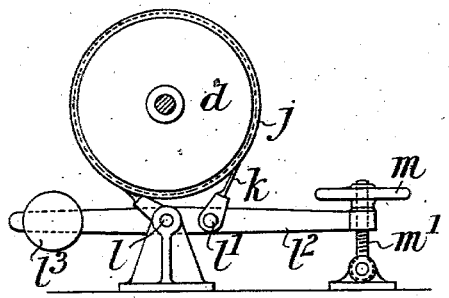
Figure 7:
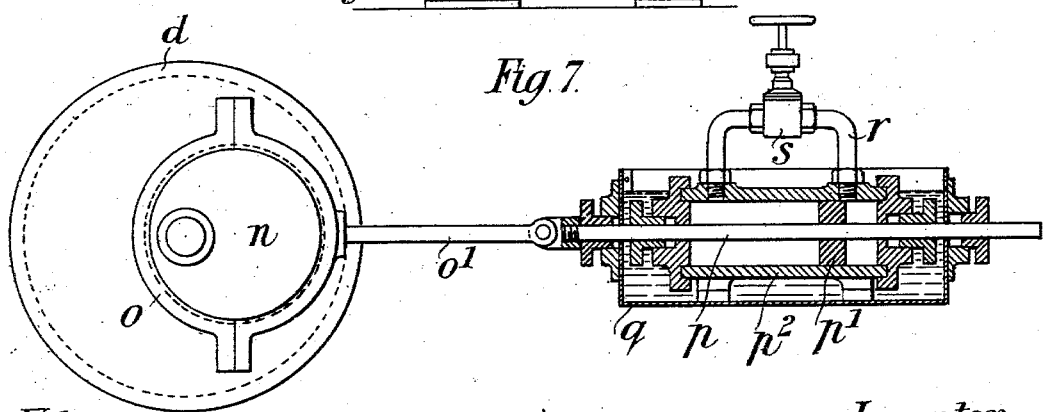

In the accompanying drawings, Figure 1 is a sectional side elevation of variable and reversing gear made according to the invention. Fig. 2 is a sectional plan view thereof. Fig. 3 is an end view thereof. Fig. 4 is a view of the gear-box, showing the interior thereof. Fig. 5 is a plan view of a slightly-modified form of gear. Fig. 6 is an end view of an arrangement, drawn to a smaller scale, showing a further method of controlling the speed of the gear-box; and Fig. 7 is a sectional side view illustrating another method of controlling the gear-box.

Referring first to the arrangement illustrated in Figs. 1 to 4, $a$ is the driving-shaft, the said shaft being mounted in bearings $a'$ in standards $a^2$, and $b$ is the driven shaft, mounted in the bearings $b'$ in the standard $b^2$. The end of the driving-shaft $a$ has keyed upon it the toothed wheel $c$, gearing with the similar wheel $c'$, loosely mounted upon the pivot-pin $c^0$, held in the frame or gear-box $d$, which is loosely mounted upon the driving-shaft $a$ and the driven shaft $b$—that is to say, being formed with sleeves $d'\ d'$, through which the ends of the said driving and driven shafts pass. The wheel $c'$ gears with a wheel $c^2$, mounted in the gear-box $d$ in a manner similar to that in which the wheel $c'$ is mounted and the spindle $c^3$ of which has keyed upon it a wheel $c^4$, gearing with a wheel $c^5$, keyed upon the end of the driven shaft $b$, which is in axial alinement with the driving-shaft $a$. With gearing arranged in this manner it will be obvious that the driven shaft $b$ will be rotated in the reverse direction to that of the driving-shaft $a$. If, however, a load be placed on the driven shaft $b$ and the gear-box $d$ be left free, the said gear-box will rotate in the same direction as the driving-shaft $a$ and will transmit no motion to the driven shaft $b$.

As above described, to vary the speed suitable means are provided for rotating the gear-box $d$ with respect to the driving-shaft $a$. In the form of apparatus shown in Figs. 1 to 4 the means employed comprise a worm-wheel $e$, keyed upon one of the sleeves $d'$ of the gear-box $d$ and gearing with a worm $f$, keyed upon a spindle $f'$, supported upon centers $f^2 f^2$, the said spindle $f'$ having keyed upon it the pinion $f^3$, gearing with a pinion $g$ upon a spindle $g'$, supported on centers $g^2 g^2$ and having mounted upon it a friction-roller $h$, the said friction-roller being adapted to slide upon a feather-key upon the spindle $g'$. The said friction-roller $h$ can be traversed across the spindle $g'$ by means of a fork $h'$, attached to a sliding rod $h^2$, adapted to be actuated by suitable means, such as a lever. (Not shown.) The friction disk or roller $h$ is held in frictional contact with a friction disk $i$, which is mounted on a shaft $i'$ and slides on a feather on the said shaft, so that it can be held against the friction-roller $h$ by means of the spring $i^2$, coiled upon the shaft $i'$, which is driven from the driving-shaft $a$ by means of the toothed gear $i^3$. With this arrangement when the driving-shaft $a$ is rotating and the friction-roller $h$ is opposite the center of the disk $i$ the said roller communicates no movement to the gear box or frame, which is held from rotating by the worm $e$. It will therefore be seen that the motion of the driving-shaft $a$ is transmitted to the driven shaft $b$ by the intermediate gear-wheels $c$ $c'$, &c., in the gear-box in such a manner that the said shaft $b$ rotates at the same speed as but in the opposite direction to the driving-shaft $a$. If now the friction-roller $h$ be moved by the fork $h'$ toward the periphery of the disk $i$ in the direction necessary to cause the roller $h$ to rotate the worm $e$, and consequently the gear-box $d$, in the same direction as the driving-shaft $a$, the result will be that the speed of the driving-shaft is reduced in proportion as the speed of the gear-box increases, a point being ultimately reached when the driven shaft $b$ has no motion imparted to it. Should the friction-roller $h$ be moved still farther from the center of the disk $i$, the driven shaft $b$ will be rotated in the same direction as the driving-shaft $a$. If the friction-roller $h$ be moved from the center in the opposite direction to that above described, the movement of the gear-box takes place in the opposite direction to that of the driving-shaft and the movement imparted to it will proportionately increase the speed of the driven shaft, which will rotate in the opposite direction to the driving-shaft, as before.

In Fig. 5 there is shown a slightly-modified arrangement of gear which is specially suitable when the apparatus is required only for reducing the speed and reversing the direction of rotation, but not for increasing the speed. In this arrangement the friction-disk $i$ is mounted directly on the driving-shaft $a$, the movement of rotation of the said disk being communicated to the worm $e$ in the same manner as that above described with reference to Figs. 1 to 4. As the friction-roller can only move along the disk $i$ at one side of the center of the driving-shaft $a$, it will be obvious that with this arrangement the speed can only be reduced. By altering the gearing, however, the same arrangement can be employed for increasing the speed; but it will be clear that this construction can only serve for either increasing or decreasing speed and not for both.

In Fig. 6 a modified arrangement is shown, whereby the speed of the driven shaft $b$ can be reduced. In this arrangement the gear-box $d$ has formed around its outer circumference a brake-ring $j$, in which is fitted an ordinary brake-strap $k$, the ends of which are secured to the fulcrum $l$ and point $l'$ of a lever $l^2$, provided with a counterbalance $l^3$ at one end and having pressure applied to the other end by means of the hand-wheel $m$, which works upon the screw $m'$, passing through a hole in the end of the said lever $l^2$.

By tightening the brake-band the rotation of the gear-box $d$ is retarded, thus increasing the speed imparted to the driven shaft, which rises to the speed of the driving-shaft $a$ when the gear-box $d$ is completely restrained from rotating.

In Fig. 7 there is shown a further modification for producing the same result as that illustrated in Fig. 6. In this case the gear-box is provided with an eccentric $n$, keyed to one of the sleeves $d'$ and which is provided with an eccentric-strap $o$ and rod $o'$, the end of which is jointed to a piston-rod $p$, having a piston $p'$ working in the cylinder $p^2$ of a small circulating-pump filled with water, oil, or other suitable fluid. The pump is mounted in a box or tank $q$, filled with the same fluid as that in the cylinder, so that any leakage of fluid through the glands may be drawn back into the pump by the return stroke of the piston. The action of the pump-piston $p'$ forces fluid contained in the cylinder through the pipe $r$, which connects the cylinder on the two sides of the piston. The said pipe $r$ is provided with a stop-valve $s$, by opening or closing which the resistance to the passage of the fluid can be varied, thus controlling the resistance to rotation of the gear-box $d$. By completely closing the valve the movement of the piston is quite prevented and the gear-box is held stationary. With this arrangement it will also be obvious that the speed of the driving-shaft varies automatically with the load upon it—that is to say, decreases with an increased load and increases with a lighter load. This result is of course independent of the variation in speed which is obtained by adjusting the valve.

Having now particularly described and ascertained the nature of my said invention and in what manner the same is to be performed, I declare that what I claim is—

1. In a variable-speed and reversing gear, the combination with a driving-shaft and a driven shaft in axial alinement and having abutting ends, of a rotary member loosely mounted with respect to both of said shafts, a train of gearing connecting said shafts for reversing the movements thereof when said rotary member is stationary, a portion of said train being carried by said rotary member, and controlling mechanism operatively connected with said rotary member for regulating the direction and speed of the driven shaft, and means for applying power to the driving-shaft, substantially as described.

2. In a variable-speed and reversing gear, the combination with a driving-shaft and a driven shaft in axial alinement and having abutting ends, of a rotary member loosely mounted with respect to both of said shafts, a train of gearing connecting said shafts for reversing the movements thereof, a portion of said train being carried by said rotary member, and controlling mechanism for the driven shaft including a friction-disk operatively connected with the driving-shaft, a longitudinally-movable friction-wheel engaging the face of said disk and mechanism for moving said friction-wheel transversely across the axis of said disk whereby the said rotary member may be caused to remain stationary or be revolved at variable speeds in either direction, to control the direction and speed of rotation of the driven shaft, substantially as described.

3. In a variable-speed and reversing gear, the combination with a driving-shaft and a driven shaft in axial alinement and having abutting ends, of gear-wheels on the abutting ends of said shafts, a rotary member loosely mounted with respect to both of said shafts, a train of gearing carried by said rotary member for transmitting reverse motion to the driven shaft from the driving-shaft when said arm or box is stationary, driving mechanism for said rotary member including among its members, a friction-disk operatively connected with the driving-shaft, a longitudinally-movable friction-wheel engaging the face of said disk and operatively connected with said rotary member and mechanism for moving said friction-wheel transversely of said disk across its axis of rotation, whereby the said rotary member may be caused to remain stationary or be revolved at variable speeds in either direction to control the direction and speed of rotation of the driven shaft, substantially as described.

4. In a variable-speed and reversing gear, the combination with a driving-shaft and a driven shaft in axial alinement and having abutting ends, of a rotary member mounted loosely with respect to both of said shafts, a gear-wheel secured to the driving-shaft adjacent to its end, a gear-wheel secured to the driven shaft adjacent to its end and an intermediate gear-wheel mounted on said rotary member and meshing with the gear-wheel on the driving-shaft, a pair of connected gear-wheels mounted on said rotary member, one meshing with the intermediate gear-wheel and the other with the gear-wheel on the driven shaft, a worm-wheel secured to said rotary member, a worm-shaft, a worm on said shaft engaging said worm-wheel, a friction-disk operatively connected with the driving-shaft, a longitudinally-movable friction-wheel engaging the face of said disk and operatively connected with the worm-shaft and mechanism for moving said friction-wheel transversely of the friction-disk across its axis of rotation, whereby the said rotary member may be caused to remain stationary or be revolved at variable speeds in either direction to control the direction of rotation and speed of the driven shaft, substantially as described.

5. In a variable-speed and reversing gear, the combination with a driving-shaft and a driven shaft in axial alinement and having abutting ends, of supporting-bearings for said shafts on opposite sides of said abutting portions, a sleeve in each bearing concentric with and loosely mounted upon one of said shafts, a rotary member secured to said sleeves and inclosing the abutting ends of said shaft, a gear-wheel secured to the driven shaft within said rotary member, a gear-wheel secured to the driving-shaft within said rotary member, an intermediate gear-wheel mounted in said rotary member and meshing with the gear-wheel on the driving-shaft, a pair of connected gear-wheels mounted in said rotary member, one of said wheels meshing with the intermediate gear-wheel and the other with the gear-wheel on the driven shaft, a worm-wheel secured to one of said sleeves, a worm-shaft, a worm on said worm-shaft engaging said worm-wheel, a friction-disk operatively connected with the driving-shaft, a longitudinally-movable friction-wheel engaging the face of said disk and operatively connected with said worm-shaft and mechanism for moving said friction-wheel transversely of the friction-disk across its axis of rotation whereby the said rotary member may be caused to remain stationary or be revolved at variable speeds in either direction, to control the direction of rotation and speed of the driven shaft, substantially as described.

HERBERT CHARLES SHEPPARD.

Witnesses:
A. W. BOUCHER,
GEORGE LARKIN.